(12) United States Patent
Fleischer et al.

(10) Patent No.: US 11,943,002 B2
(45) Date of Patent: Mar. 26, 2024

(54) METHOD FOR PROCESSING OF PASSIVE INTERMODULATION PRODUCTS

(71) Applicant: Nokia Solutions and Networks Oy, Espoo (FI)

(72) Inventors: Marko Fleischer, Unterhaching (DE); Helmut Heinz, Turkheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 59 days.

(21) Appl. No.: 17/597,820

(22) PCT Filed: Jul. 31, 2019

(86) PCT No.: PCT/EP2019/070697
§ 371 (c)(1),
(2) Date: Jan. 25, 2022

(87) PCT Pub. No.: WO2021/018397
PCT Pub. Date: Feb. 4, 2021

(65) Prior Publication Data
US 2022/0263588 A1    Aug. 18, 2022

(51) Int. Cl.
*H04W 24/08*    (2009.01)
*H04B 1/10*    (2006.01)
(Continued)

(52) U.S. Cl.
CPC ........... *H04B 17/21* (2015.01); *H04B 1/1036* (2013.01); *H04B 17/345* (2015.01)

(58) Field of Classification Search
CPC ........ H04B 1/123; H04B 1/525; H04B 1/109; H04B 1/1027; H04B 1/1081; H04B 17/345; H04B 1/0475; H04B 17/3912; H04B 7/0426; H04L 41/149; H04L 63/0815; H04L 63/102; H04L 63/108; H04L 51/214; H04L 61/103; H04L 9/3231;
(Continued)

(56) References Cited

U.S. PATENT DOCUMENTS

2007/0184782 A1    8/2007    Sahota et al. ............... 455/63.1
2012/0295558 A1    11/2012   Wang et al. .................... 455/79
(Continued)

FOREIGN PATENT DOCUMENTS

CN    1614905 A    5/2005
CN    101542938 A    9/2009
(Continued)

*Primary Examiner* — Eva Y Puente
(74) *Attorney, Agent, or Firm* — Joseph C. Drish; Harrington & Smith

(57) ABSTRACT

The present subject matter relates to a method including receiving a set of signals from transmitters of a communication system, the communication system having a system configuration. A first and second set of machine learned parameters may be provided in accordance with the system configuration. The received signals may be weighted using the first set of machine learned parameters. The weighted signals may be combined to generate a composite signal. The composite signal may be weighted with the second set of machine learned parameters in order to estimate an interference signal that is caused by the set of signals at a receiver of the communication system.

20 Claims, 6 Drawing Sheets

(51) Int. Cl.
*H04B 17/21* (2015.01)
*H04B 17/345* (2015.01)

(58) Field of Classification Search
CPC .. H04L 9/3236; H04W 24/08; H04W 72/541; H04W 24/10; H04W 52/243; H04W 88/085; H04W 52/223; H04W 52/245; H04W 72/0453
USPC .......................................................... 375/346
See application file for complete search history.

(56) References Cited

U.S. PATENT DOCUMENTS

| | | |
|---|---|---|
| 2014/0036736 A1 | 2/2014 | Wyville .......................... 370/278 |
| 2016/0134310 A1 | 5/2016 | Miao et al. ......................... 1/475 |
| 2018/0219636 A1* | 8/2018 | Gale .................. H04B 17/0085 |
| 2019/0007078 A1 | 1/2019 | Tsui et al. .......................... 1/109 |
| 2019/0052294 A1 | 2/2019 | Abdelmonen |
| 2019/0158131 A1* | 5/2019 | Tsui ...................... H04B 1/0475 |
| 2020/0274629 A1* | 8/2020 | Wilson ................. H04B 7/0413 |
| 2021/0160746 A1* | 5/2021 | Diggins ............ H04W 36/0083 |
| 2021/0175983 A1* | 6/2021 | Gopalan ................. H04B 17/19 |

FOREIGN PATENT DOCUMENTS

| | | |
|---|---|---|
| CN | 106330219 A | 1/2017 |
| CN | 107666361 A | 2/2018 |
| GB | 2531357 A | 4/2016 |
| WO | WO 2019/011422 A1 | 1/2019 |

\* cited by examiner

METHOD FOR PROCESSING OF PASSIVE INTERMODULATION PRODUCTS

CROSS REFERENCE TO RELATED APPLICATION

This patent application is a U.S. National Stage application of International Patent Application Number PCT/EP2019/070697 filed Jul. 31, 2019, which is hereby incorporated by reference in its entirety.

FIELD OF THE INVENTION

Various example embodiments relate to computer networking, and more particularly to a method for processing of passive intermodulation products.

BACKGROUND

Intermodulation products may be generated in a wireless system when two or more signals at different frequencies are transmitted along a signal path including a component having a non-linear transmission characteristic; these products differ in frequency from the signals from which they were generated, and may potentially cause interference to other signals.

SUMMARY

Example embodiments provide a method comprising: receiving a set of signals from transmitters of a communication system, the communication system having a system configuration, providing a first set of machine learned parameters and a second set of one or more machine learned parameters in accordance with the system configuration, weighting the received signals using the first set of machine learned parameters, combining the weighted signals to generate a composite signal, weighting the composite signal with the second set of machine learned parameters, thereby estimating an interference signal that is caused by the set of signals at a receiver of the communication system.

According to further example embodiments, an apparatus comprises: an estimation circuitry configured to receive a set of signals from transmitters of a communication system, the communication system having a system configuration, weight the received signals using a first set of machine learned parameters; combine the weighted signals to generate a composite signal, weight the composite signal with a second set of one or more machine learned parameters, thereby estimating an interference signal that is caused by the set of signals at a receiver of the communication system.

According to further example embodiments, a computer program comprises instructions stored thereon for performing at least the following: receiving a set of signals from transmitters of a communication system, the communication system having a system configuration, providing a first set of machine learned parameters and second set of one or more machine learned parameters in accordance with the system configuration, weighting the received signals using the first set of machine learned parameters, combining the weighted signals to generate a composite signal, weighting the composite signal with the second set of machine learned parameters, thereby estimating an interference signal that is caused by the set of signals at a receiver of the communication system.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
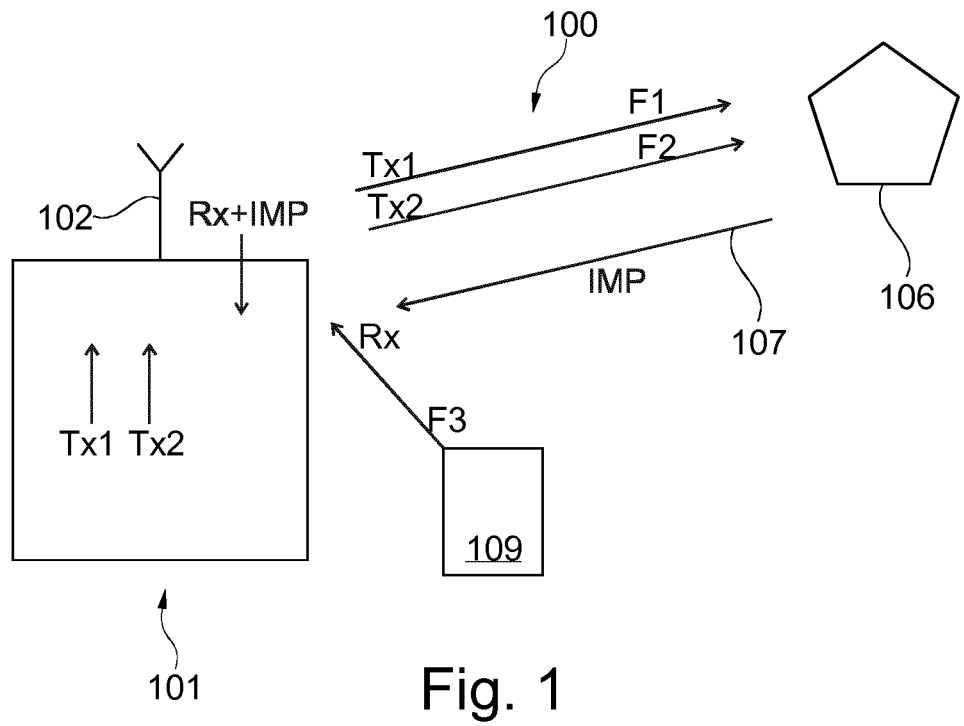
FIG. 1 depicts a diagram of a communication system.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The present subject matter may enable an accurate estimation of PIM correction signals. The present subject matter may enable a flexible choice of frequencies in a wireless system regardless of the presence of intermodulation frequencies. This may particularly be advantageous with the increasing requirements for bandwidth, output power and the coexistence of multiple radio standards such as 2G, 3G, 4G and 5G.

According to an example, the method further comprises correcting a signal being received at the receiver by using the interference signal.

The values of the first and second sets of machine learned parameters may be optimized values of first and second sets of parameters respectively. For example, a PIM signal or interference signal may be modeled as function of the composite signal, wherein the second set of parameters are parameters of the model. The modeling may be based on or may use the system configuration.

The parallel operation of the receiver and the transmitters may cause interferences which may limit in particular the sensitivity on the receiver. For example, when considering e.g. a high power broadband multi-standard multicarrier FDD system, it is possible that the system performance and sensitivity is affected by transmitter induced intermodulation products falling into the receive band, e.g. at RX channels. This example may mitigate the distortion effect that affects received signals at the receiver.

According to an example, the correcting of the signal includes a subtraction processing of the interference signal from the signal being received.

According to an example, the method further comprises aligning the set of signals, in accordance with delays caused by the system configuration, before the weighting. Each individual signal of the set of signals may be correlated with the received signal to produce correlation data representing a correlation for each individual signal. The correlation data may be used to define delays to be used in the aligning step. The delays may be propagation delays inside the communication system.

This example may further increase the estimation accuracy of the PIM correction signals and may reduce memory usage inside the estimation circuitry.

According to an example, the aligning is performed so that the estimated interference signal is indicative of a particular order intermodulation (IM) product. For example, for each IM's frequency location, a PIM issue may be described by a model the PIM (PIM waveform) observed in a receiver chain. The model may include one or more order IM products. For example, a PIM can be modeled, for an IM3 location, taking into account only the IM3 product as follows: $b3*ts(n).*(ts(n).*conj(ts(n)))$, where ts is the composite signal and $conj(ts(n))$ is the complex conjugate of $ts(n)$ and b3 forms the second set of parameters. In another example, a PIM can be modeled, for an IM3 location, taking into account the IM3 and IM5 products as follows: $b3*ts(n).*(ts(n).*conj(ts(n)))+b5*ts(n).*(ts(n).*conj(ts(n)))^2$. Thus, each PIM issue may be associated with respective delays, first and second sets of machine learned parameters.

According to an example, the method further comprises repeating the providing, weighting, combining and weighting steps, wherein the aligning is performed so that the estimated interference signal is indicative of another order IM product which is different from the order IM product.

The nonlinear behavior that is taken into account by the present subject matter may be more complex, e.g. including higher order terms like the 5th or 7th order or involving a piecewise nonlinear input output mapping, since only a single block may need to be used and modelled in order to perform the present method. The single block may be a block used for weighting the (single) composite signal. This example may enable to double/triple generic PIM structures with different delay compensated input data to account for several concurrent PIM issues.

According to an example, the first set of machine learned parameters are complex parameters, wherein the weighting of each of the received signals is performed using a respective single one of the complex parameters. The weighting may be performed to modify a characteristic of the signal. The characteristic may for example comprise at least one of the gain and the phase of the signal. For example, each individual signal of the set of signals may be modified in gain and phase via a single complex coefficient.

According to an example, the weighting of each of the received signals is performed using a linear filter comprising taps of complex parameters, the complex parameters of the taps of the filters being the first set of machine learned parameters. Using linear tap filters may enable to use more complex parameters for weighing the signals. This may further increase the accuracy of the PIM correction signal estimation.

These weighting examples may enable a flexible implementation of the weighting in accordance with the present subject matter.

According to an example, the weighting of the received signals, the combining and the weighting of the composite signal defines an estimation method that estimates the interference signal for the received set of signals. The method further comprises optimizing an objective function in a multidimensional space defined by the first and second sets of parameters. The optimizing comprises: providing an initial set of values of the first second sets of parameters, iteratively modifying the values of the first and second sets of parameters until an optimal value of the objective function is obtained, wherein in each iteration the method comprises receiving a set of training transmit signals, performing the estimation method, and evaluating the objective function. The objective function relates a received training receive signal at the receiver with a corrected signal that is obtained by correcting the received training receive signal by the interference signal caused by the set of training transmit signals. The optimization results in the first and second sets of machine learned parameters. In one example, the same set of training transmit signals may be used in each iteration. This may save processing resources that would otherwise be required to use different set of training transmit signals. In another example, a different set of training transmit signals may be used for each iteration. This may improve the training as it may reduce potential bias that may be introduced when using the same input for multiple iterations.

This example enables a training method for learning optimal values of the first and second sets of parameters that can be used in a real-time system to perform the estimation and cancelation of the PIM correction signal. For example, the training may be performed in the same or different apparatus where the estimation and cancelation of the PIM correction signal is executed. Performing the training in the same apparatus may enable an accurate determination of the first and second sets of the machine learned parameters since the same apparatus is used for the training and for the application stage. Performing the training in a different apparatus may enable to generate in a central manner and consistently the first and second sets of the machine learned parameters for different target apparatuses where the present method may be executed. In one example, the training method may be performed using a computer program that models the elements of the apparatus and that does the training method using the modeled apparatus.

In one example, the values of the first and second set of machine learned parameters may be reused as new start values of the first and second set of parameters for repeating the training method e.g. at a later point of time. This may for example enable to adapt the first set and second set machine learned parameters to account for PIM changes during a run mode. This may reduce the required number of re-iterations in the optimization.

According to an example, each set of signals of the sets of training transmit signals are uncorrelated signals, and each signal of the set of signals has all resource blocks being used for a maximum bandwidth usage and power. This may improve the training process and thus the resulting first and second sets of machine learned parameters may have optimal values that can be used to better estimate the PIM correction signal.

According to an example, the objective function is 10 log(RMS(RXb)/RMS(RXa)), wherein the optimizing comprises maximizing the objective function, wherein Rxb is a signal received at the receiver and Rxa is a corrected signal that results from the subtraction of the interference signal from Rxb. The optimization of the cost function may for example be performed using the "Nelder Mead" method or a gradient based method. The gradient based method may have a better conversion speed.

According to an example, the system configuration indicates at least one of frequencies of the transmitters and receiver and one or more sources of PIM.

The system configuration is descriptive of the communication system. The communication system may comprise the apparatus. For example, the system configuration may define the number of transmitters, the placements of the transmitters, the receiver and the source(s) of PIMs etc. For example, the same system configuration of the communication system may be used to perform the training and to use the resulting first and second sets of machine leaned parameters to estimate the interference signal (e.g. in a real-time system).

For example, the received set of signals may comprise signals s1, s2 ... s10. The signals may be weighted using the first set of machine learned parameters. Following the example, the first set of parameters may comprise parameters a1, a2, a3 ... a10. Each signal sj (j=1 ... 10) of the received set of signals may be weighted by a respective parameter aj. Each parameter of the parameters may be a complex parameter aj=c1j+i*c2j. Each parameter aj of the parameters may be used to weight its respective signal sj so that the gain and phase of the signal sj may be changed accordingly. The weighted signals aj*sj may be combined e.g. summed to obtain a composite signal ts e.g. ts=a1*s1+a2*s2+ ... a10*s10.

A PIM issue may for example be modeled, for an IM3 location, taking into account the IM3 and IM5 products as follows: b3*ts(n).*(ts(n).*conj(ts(n)))+b5*ts(n).*(ts(n).*conj(ts(n)))^2, where n is time. In this case, b3 and b5 are the second set of parameters. In another example, PIM issue may be modeled for an IM3 location using the IM3 product only with different delays as follows: b3*ts(n).*(ts(n).*conj(ts(n)))+b13*ts(n).*(ts(n−1).*conj(ts(n−1)))+b23*ts(n).*(ts(n).)conj(ts(n)))+b33*ts(n+1).*(ts(n+1).*conj(ts(n+1))). In this case, b3 and b13, b23 and b33 are the second set of parameters.

The first set and second set machine learned parameters are optimized values of first set (e.g. a1 ... a10) and second set (b3 and b5) of parameters respectively. The values of the first and second sets of parameters are optimized so that they can be used to estimate the interference signal. The values a1 ... a10 and b3-b5 may be estimated together in a multidimensional space defined by a1 ... a10 and b3-b5 and using a common cost function.

The values a1 ... a10 and b3-b5 may be reused as new start values of the first and second set of parameters in another optimization. This may for example enable to adapt the first set and second set machine learned parameters to account for PIM changes during a run mode. This may reduce the required number of re-iterations in the optimization.

According to an example, the apparatus further comprises a subtraction circuitry configured to correct a signal being received at the receiver by using the interference signal.

According to an example, the subtraction circuitry is configured to correct the signal by a subtraction processing of the interference signal from the signal being received.

According to an example, the estimation circuitry is further configured to align the set of signals, in accordance with delays caused by the system configuration, before the weighting.

According to an example, the estimation circuitry is further configured to align the set of signals so that the estimated interference signal is indicative of a particular order intermodulation, IM, product.

According to an example, the estimation circuitry is further configured to repeat the weighting, combining and weighting steps so that the estimated interference signal is indicative of another order IM product which is different from the order IM product.

According to an example, the first set of parameters are complex parameters, wherein the estimation circuitry is configured to perform the weighting of each of the received signals using a respective one parameter of the complex parameters.

According to an example, the estimation circuitry is configured to perform the weighting using a linear filter comprising taps of complex parameters, the complex parameters of the taps of the filters being the first set of machine learned parameters.

According to an example, the estimation circuitry is configured to receive from an optimizer of the apparatus the set first set of machine learned parameters and the second set of machine learned parameters. The optimizer is configured to optimize an objective function in a multidimensional space defined by the first and second sets of parameters in order to obtain the set first set of machine learned parameters and the second set of machine learned parameters, the objective function relating a received training receive signal at the receiver with a corrected signal that is obtained by correcting the received training receive signal by the interference signal caused by a set of training transmit signals received at the estimation circuitry.

According to an example, the apparatus comprises the transmitters and the receiver.

FIG. 1 depicts a diagram of a communication system 100. The communication system 100 comprises a transceiver system 101. The transceiver system 101 may be a base station for a cellular communication network, but is not limited thereto. The transceiver system 101 may, for example, be a multi-carrier or multi-band system (e.g., a system that simultaneously operates in two different frequency bands or at least two carriers in the same frequency band).

The transceiver system 101 is configured to send a set of signals via an antenna 102. Although only a set of two signals Tx1 and Tx2 is illustrated for this particular example, it should be appreciated that the set of signals may comprise more than two signals.

The set of signals Tx1 and Tx2 are transmitted at frequencies F1 and F2 respectively. However, intermodulation products may be generated when the set of signals Tx1 and Tx2 are transmitted along a signal path including a source of PIM. The source of PIM may be inside the transceiver system inducing a conducted PIM and/or outside the transceiver system triggering an air induced PIM. The air induced PIM may be caused by sources of PIM at predefined distances to the transceiver system 101. For example, in case of a transceiver system of a MIMO installation with several transmit signals, the transmit signals on the same frequency may cause higher power spectrum densities and thus metallic objects in a 10 m distance or more from the transceiver system 101 are not negligible and can cause uplink (UL) desensitization and throughput losses.

In the example shown in FIG. 1, the set of signals Tx1 and Tx2 impinge upon a source of PIM 106. The source of PIM 106 may, for example, be a metallic component comprising a ferromagnetic material. IM products 107 of the set of signals Tx1 and Tx2 are generated due to the non-linear response of the source of PIM 106.

The set of signals Tx1 and Tx2 may produce, for example, third order IM products at frequencies 2F1-F2 and 2F2-F1, fifth order IM products at frequencies 3F1-2F2 and 3F2-2F1 and other products. This provides relationships between signal frequencies, e.g. F1-F2, and the frequencies of IM products produced from those frequencies. FIG. 1 shows that IM products 107 of the set of signals Tx1 and Tx2 are transmitted from the source of PIM 106. The transmission of the IM products 107 may be performed at a respective frequency of the IM products 107.

The IM products 107 fall at least in part, within a received channel at frequency F3 and appear as interference to a received signal Rx that is transmitted at radio frequency from, for example, a user equipment 109 in communication with the transceiver system 101.

Figure 2:
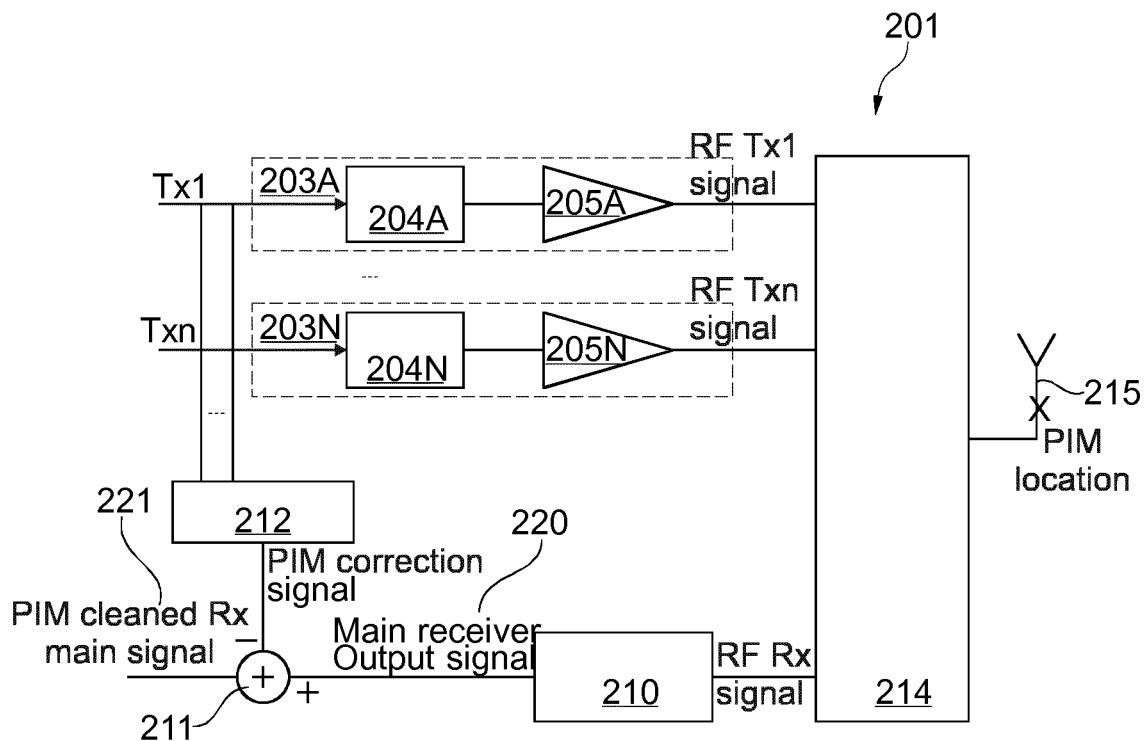
FIG. 2 depicts a diagram of a transceiver system in accordance with an example of the present subject matter.

FIG. 2 depicts a diagram of a transceiver system 201 in accordance with an example of the present subject matter. The transceiver system 201 may for example be configured to operate in a communication system such as communication system 100 of FIG. 1 but it is not limited to.

As illustrated, the transceiver system 201 includes multiple transmitters 203A-N and a receiver 210 (also referred to herein as main receiver) coupled to an antenna 215 via a duplexer 214.

Each of the transmitters 203A-N includes a digital-to-analog (D/A) converter 204A-N and a PA 205A-N connected as shown. Each of the transmitters 203A-N operates to process a respective digital input signal Tx1-Txn, which may for example be a digital baseband signal, to output a radio frequency transmit signal. The radio frequency transmit signal of each of the transmitters 203A-N passes through the duplexer 214 to the antenna 215 such that the radio frequency transmit signal is transmitted by the transceiver system 201.

After being output by the transmitter 203A-N, the radio frequency transmit signal passes through a source of PIM indicated by an "X" in FIG. 2. As indicated in connection with the antenna 215, the location where the distortion (e.g. the PIM effect) is caused may be located there (indicated by an "X"), but it is to be noted that there may be more than one location where corresponding distortions (PIM effects) are caused e.g. as shown with reference to FIG. 1.

Due to the non-linearity of the source of PIM, PIM may be introduced into a radio frequency receive signal received at the antenna 215. The PIM may comprise IM products of the radio frequency transmit signals. The IM products include 3rd order IM products, fifth order IM products, etc.

The receiver 210 may, for example, include receiver components such as a LNA, filters, a down-conversion circuitry, an analog-to-digital converter, and the like. The receiver 210 operates to process (e.g., amplify, filter, down-convert, and analog-to-digital convert) a radio frequency receive signal received from the antenna 215 via the duplexer 214 to output a digital output signal 220, which is referred to herein as a main receiver output signal 220.

The IM products of the radio frequency transmit signals produced by the source of PIM that fall within a passband of the receiver 210 result in a PIM distortion in the main receiver output signal that is output by the receiver 210.

An estimate of the PIM distortion, which is a digital signal referred to herein as a PIM correction signal or interference signal, is generated and provided to subtraction circuitry 211. The subtraction circuitry 211 operates to subtract the PIM correction signal from the main receiver output signal 220 in the digital domain to provide a corrected output signal 221 which is referred to as a IM cleaned Rx main signal 221. The PIM correction signal is generated such that the PIM distortion in the corrected output signal is minimized, or at least substantially reduced, as compared to the PIM distortion in the main receiver output signal 220.

The PIM correction signal is generated by an estimation circuitry 212. The estimation circuitry 212 and the subtraction circuitry 211 may be referred to as a PIM correction system. The PIM correction system may enable a generic MIMO PIM cancellation, in accordance with the present subject matter, for FDD systems.

The estimation circuitry 212 is configured to receive the digital input signals Tx1 . . . Txn and to estimate the PIM correction signal in accordance with the present subject matter. In one example, the estimation circuitry 212 may be provided using an FPGA or ASIC implementation.

As used in this application, the term "circuitry" may refer to one or more or all of the following:
  a) hardware-only circuit implementations (such as implementations in only analog and/or digital circuitry) and
  b) combinations of hardware circuits and software, such as (as applicable):
      I. a combination of analog and/or digital hardware circuit(s) with software/firmware and
      II. any portions of hardware processor(s) with software (including digital signal processor(s)), software, and memory(ies) that work together to cause an apparatus, such as a mobile phone or server, to perform various functions) and
  c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 3:
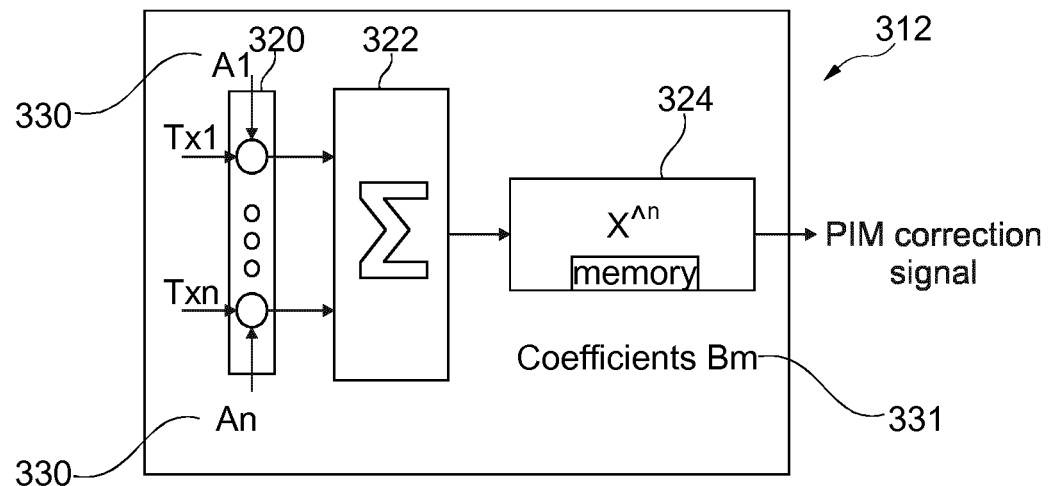
FIG. 3 depicts a block diagram of an estimation circuitry in accordance with an example of the present subject matter.

FIG. 3 depicts a block diagram of an estimation circuitry 312 in accordance with an example of the present subject matter.

The estimation circuitry 312 comprises a first weighting block 320. The first weighting block 320 is configured to weight received set of signals Tx1 . . . Txn (e.g. received from transmitters 203A-N) by respective complex coefficients (A1 . . . An) to generate a set of weighted signals. The complex coefficients A1, A2, . . . An are values of a first set of machine learned parameters (collectively referred to by reference numeral 330). The weighted signals may be combined (e.g. summed) as shown at block 322 of the estimation circuitry 312. The combination of the weighted signals results in a composite signal that is received at a second weighting block 324 (which may be named a non-linear (NL) block). The second weighting block 324 may use weights/values Bm of a PIM model of a particular order n IM product, where n=3, 5 or 7 etc. The composite signal may be weighted at the second weighting block 324 using values (Bm) of a second set of machine learned parameters (collectively referred to by reference numeral 331). The values of An and Bm of the first and second sets of machine learned parameters may be learned together on the same set of data. The values of the first and second sets of machine learned parameters 330 and 331 may be obtained using a training method in accordance with the present subject matter. The weighted composite signal may be an estimated PIM correction signal that is caused by the received signals Tx1, ... Txn.

In one example, the received signals may, optionally, be pre-processed before being weighted by the first set of machine learned parameters 330. The pre-processing comprises using a plurality of delays to generate delayed transmit signals by applying the delays to the set of signals Tx1 ... Txn. The delays may be obtained as follows. Each individual signal of the set of signals may be correlated with the received signal to produce correlation data representing a correlation for each individual signal. The correlation data may be used to define the delays. The correlation may be obtained by a cross-correlation function (xcorr) that has two arguments, wherein one of the arguments is the received signal Rx and the other argument can be a signal Tx or a particular order IM product. For example, the correlation may be obtained as a xcorr(abs(TX),abs(RX)) correlation or as a IM3 correlation xcorr(IM3(TX1,TX2),RX). The cross-correlation function determines the cross-correlation between a pair of signals (or a pair of discrete-time sequences) such as abs(TX) and abs(RX), where abs(X) returns the absolute value of each element in array X.

Figure 4:
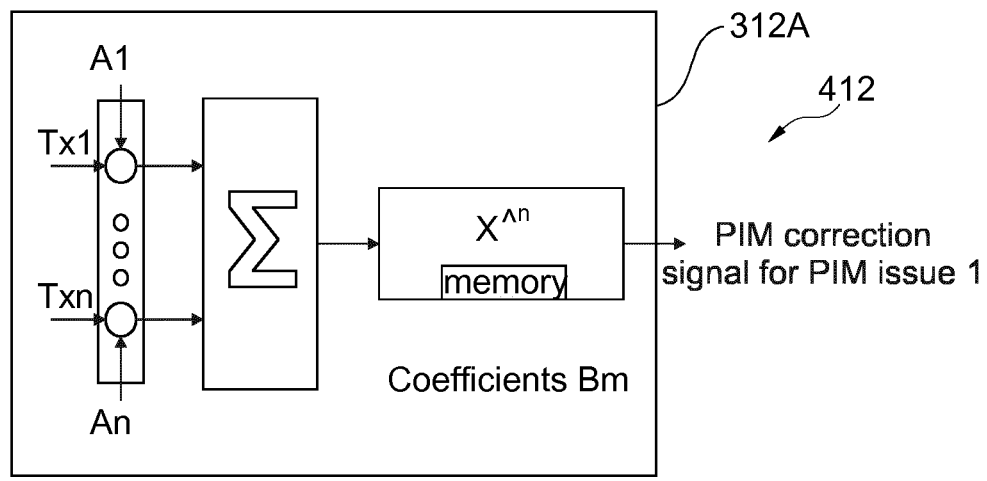
FIG. 4 depicts a block diagram of an estimation circuitry in accordance with an example of the present subject matter.
Figure 4:
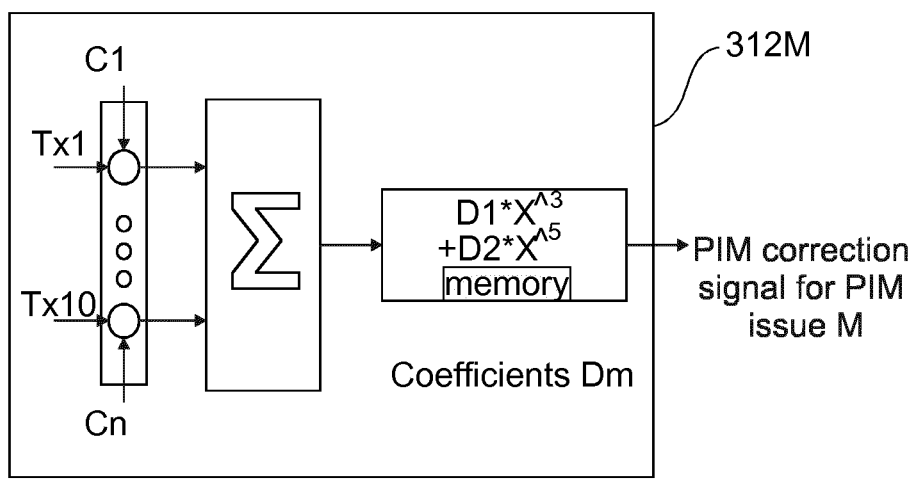

FIG. 4 depicts a block diagram of an estimation circuitry 412 in accordance with an example of the present subject matter. The estimation circuitry 412 enables to account for several concurrent PIM issues.

The estimation circuitry 412 comprises multiple estimation circuitries 312A-M. Each of the multiple estimation circuitries 312A-M is the estimation circuitry described with reference to FIG. 3, wherein each of the estimation circuitries 312A-M receives the same set of signals Tx1 ... Txn. However, each set of signals is pre-processed separately using different delay values. In addition, each of the multiple estimation circuitries 312A-M comprises its own first and second sets of machine leaned parameters 330A-M and 331A-M that are obtained for the PIM issue for which the estimation circuitry is used.

Since only a single NL block (i.e. 324) may need to be modelled, the present subject matter may enable to treat more complex NL behaviors including higher order terms like the 5th and 7th order term using an estimation circuitry as described with reference to FIG. 4.

Figure 5:
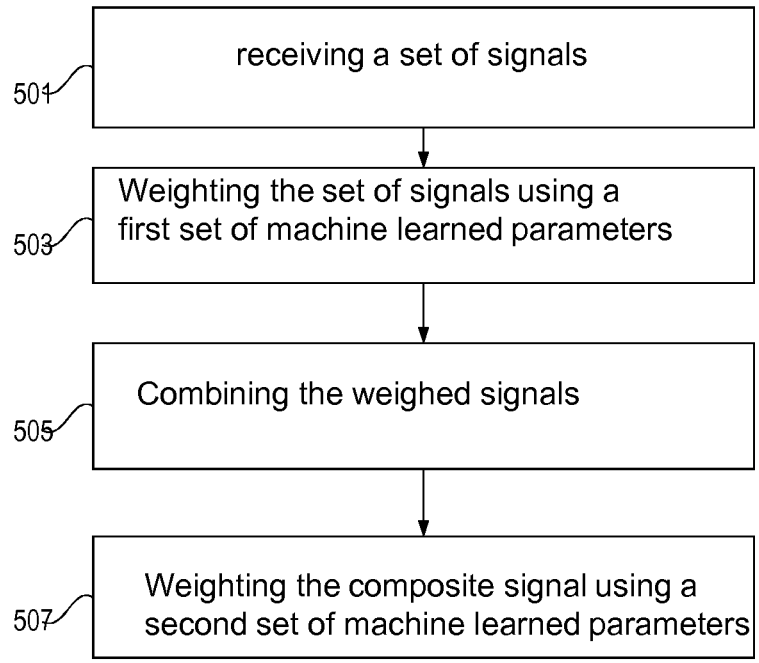
FIG. 5 is a flowchart of a method estimating a passive intermodulation (PIM) correction signal in accordance with an example of the present subject matter.

FIG. 5 is a flowchart of a method for estimating a PIM correction signal in accordance with an example of the present subject matter. For the purpose of explanation, the method may be implemented in the system illustrated in previous FIGS. 1-4, but is not limited to this implementation. For example, the method may be performed using the estimation circuitry 312. The PIM correction signal may, for example, be estimated for a specific PIM issue e.g. involving a $3^{rd}$ order IM product only. The PIM issue may be described by a model of PIM signals, wherein the second set of parameters are parameters of the model. This means that the estimation circuitry 312 may be configured accordingly e.g. the first and second sets of machine learned parameters 330 and 331 may have been obtained by a training for that specific PIM issue.

A set of signals Tx1 ... Txn may be received from the transmitters 203A-N in step 501. The set of signals Tx1 ... Txn may be received at the estimation circuitry 312.

The estimation circuitry 312 may for example receive several signals, wherein the set of signals Tx1 ... Txn may be selected from the several signals. The estimation circuitry 312 may select the set of signals Tx1 ... Txn on the basis of a determination of which signal frequencies of the received several signals may produce IM products that may fall within a channel of the receiver 210 that carries the received signal. The determination may be performed using the relationships between signal frequencies and the frequencies of IM products produced from those frequencies. On the basis of this determination, the set of signals Tx1 ... Txn may be selected.

The set of signals Tx1 ... Txn may be processed by an estimation method having steps 503 to 507 in order to estimate an interference signal caused by the set of signals.

Each individual received signal of the set of signals Tx1 ... Txn may, for example, be weighted in step 503. The weighting of the individual signal may for example be performed by modifying a characteristic of the signal. The characteristic of the signal may be at least one of a gain and phase of the signal. The modification may, for example, be performed via a single complex coefficient 330. If, for example, the first set of machine learned parameters comprises a vector A of n complex coefficients, this step 503 may involve a multiplication of the vector with the received set of signals as follows: An*Txn.

In another example, the weighting of the individual signal may be performed using a linear filter comprising taps of complex parameters, so that each individual signal of the set of signals Tx1 ... Txn may be filtered with an k tap filter. In this case, step 503 may involve a convolution operation as follows: conv($A_k$*$TX_n$), where Ak is a vector with n*k tap complex filter coefficients. Thus, the problem complexity may only linearly be dependent on the number of TX signals N, the number of filter coefficients k and a wanted complexity for the NL block. A simplest NL block may involve a third order IM product, IM3 with M=1 memory (e.g. one Bm value) and N=10, k=1, 11 complex coefficients may be for the first and second sets of machine learned parameters.

The weighted signals that result from step 503 are combined in step 505 at the block 322 in order to generate a composite signal. The combination of the weighted signals may comprise the summation of the weighted signals. The obtained composite signal is fed through the second weighting block 324 with coefficients Bm. The composite signal is weighted in step 507 using the coefficients Bm. The weighted composite signal may be an estimation of an interference signal that is caused by the set of signals Tx1 ... Txn at the receiver 210.

The estimated interference signal may be a PIM correction signal which may, for example, be used for test purpose to accurately quantify the PIM issue and measure PIM impact in the communication system 100. In another example, the PIM correction signal may be used to correct the main receiver output signal 220.

Figure 6:
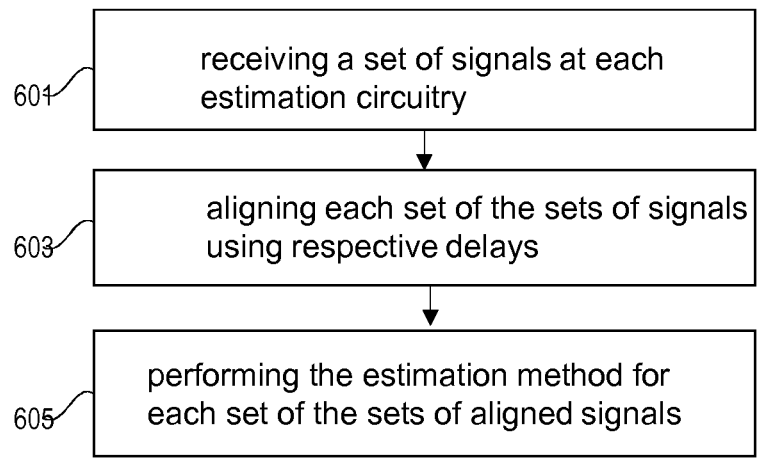
FIG. 6 is a flowchart of a method for estimating a PIM correction signal for different PIM issues in accordance with an example of the present subject matter.

FIG. 6 is a flowchart of a method for estimating a PIM correction signal for different PIM issues in accordance with an example of the present subject matter. For the purpose of explanation, the different PIM issues may comprise two PIM issues, but is not limited to. For example, a first PIM issue may involve a $3^{rd}$ order IM product and a second PIM issue may involve the $3^{rd}$ order and $5^{th}$ order IM products.

A set of signals Tx1 ... Txn may be received in step 601 from the transmitters 203A-N at each estimation circuitry of two estimation circuitries 312A and 312M of FIG. 4.

For example, estimation circuitry 312A may be configured to estimate interference signals for the first PIM issue and the estimation circuitry 312M may be configured to estimate interference signals for the second PIM issue.

The set of signals received at each of the estimation circuitries 312A and 312M may be aligned in step 603, in accordance with delays determined for the respective PIM issue. This results in multiple sets of aligned signals associated with receptive estimation circuitries 312A and 312M.

The estimation method may be performed in step 605 for each set of the sets of aligned signals at respective estimation circuitry 312 A and 312M. This may result in multiple estimated PIM correction signals.

Figure 7:
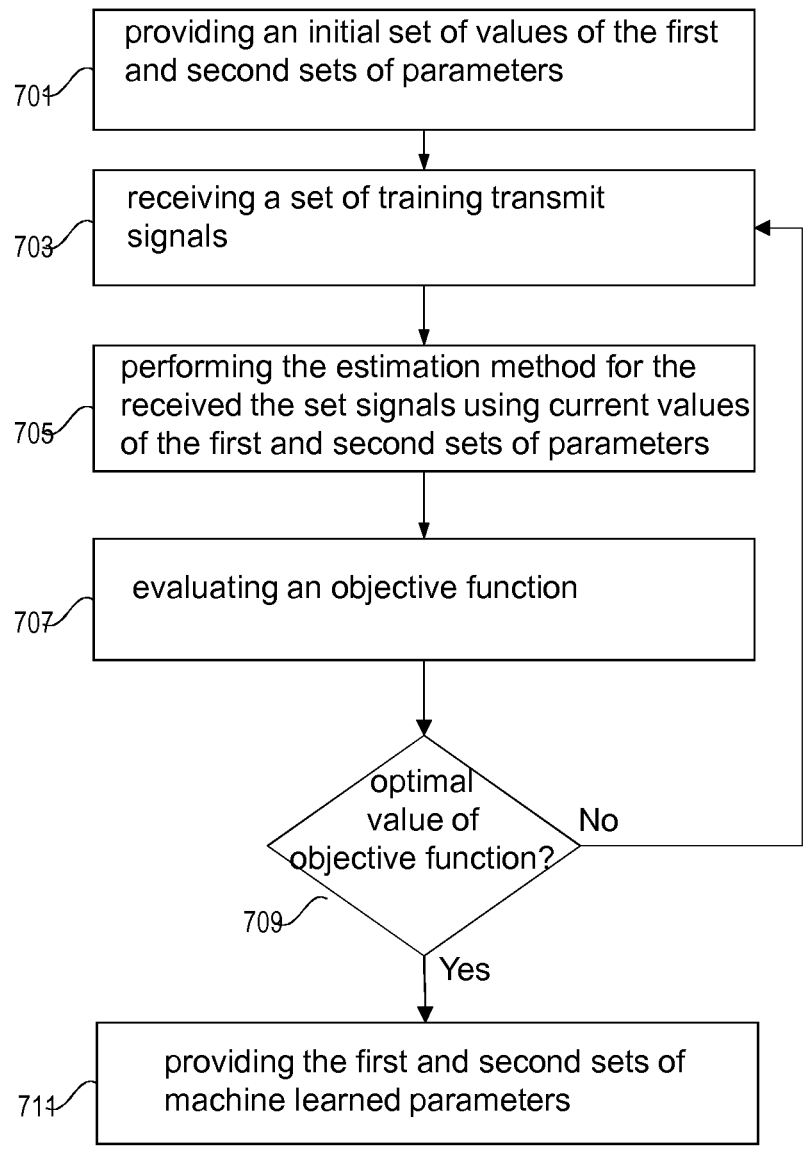
FIG. 7 is a flowchart of a method for learning optimal values of the first and second sets of parameters.

FIG. 7 is a flowchart of a method for learning optimal values of the first and second sets of parameters 330-331.

In step 701, an initial set of values of the first and second sets of parameters 330-331 may be provided. The initial set of values are the current values of the first and second sets of parameters. For example, the estimation circuitry 312 may be configured to operate with those current values in step 701.

In step 703, a set of training transmit signals may be received at the estimation circuitry 312. The set of training transmit signals are uncorrelated signals, and each signal of the set of training transmit signals has all resource blocks being used for a maximum bandwidth usage and power.

The estimation method may be performed in step 705 on the received set of training transmit signals to estimate a PIM correction signal using the current values of the first and second sets of parameters.

An objective function may be evaluated in step 707. The objective function relates a received training receive signal at the receiver 210 with a corrected signal that is obtained by correcting the received training receive signal by the interference signal caused by the set of training transmit signals. The objective function may for example be the following cost function, gain=10 log(RMS(RXb)/RMS(RXa)), where Rb is a signal received at the receiver, Rxa is a corrected signal that results from the subtraction of the interference signal from Rxb, and RMS refers to a root mean square power calculation. In another example, a receiver total wideband power (RTWP) method may be used in the cost function instead of RMS.

In one example, Rxa may be defined as $RX_a=RX_b-NL(\Sigma A_n*TX_n)$, where A is a vector with n complex coefficients. In this example, the n complex coefficients are the first set of learned machine parameters 330. $NL(\Sigma A_n*TX_n)$ may be the interference signal that is obtained by the estimation circuitry (NL).

In another example, and in case the weighting of received signals is performed using linear filters, Rxa may be defined as follows, $RX_a=RX_b-NL(\Sigma \text{conv}(A_k*TX_n))$, where Ak is vector with n*k tab complex filter coefficients. In this example, the n*k complex filter coefficients are the first machine learned set of parameters 330. $NL(\Sigma \text{conv}(A_k*TX_n))$ may be the interference signal that is obtained by the estimation circuitry (NL).

It may be determined (inquiry step 709) whether an optimal value of the objective function is obtained. If not, the current values of the first set and second set of parameters may be modified. The modified values become the current values of the first set and second sets of parameters for a next iteration of steps 703-709. The optimal value of the objective function may be a maximum value of the cost function.

If it is determined that an optimal value of the objective function is obtained, the current values of the first set and second set of parameters are values of the first and second sets of machine learned parameters. And the first and second sets of machine learned parameters may be provided in step 711.

Steps 701, 707, 709 and 711 may be performed by the optimizer and steps 703-705 may be performed by the estimation circuitry.

The method of FIG. 7 may optimize the objective function in a multidimensional space defined by the first and second sets of parameters using for example the "Nelder Mead" approach or a gradient based approach. A higher convergence speed may be obtained using a gradient-based approach while calculating a hessian matrix in accordance with a quasi-newton algorithm e.g. this may be performed using the function named "fminunc". This leads to an optimization problem to adjust the complex coefficients An and Bm in such a manner that the cost function optimizes for a maximum PIM noise correction. The optimization process as described with reference to FIG. 7 is a machine-driven iteration and learning which leads to a numerical optimum.

Figure 8:
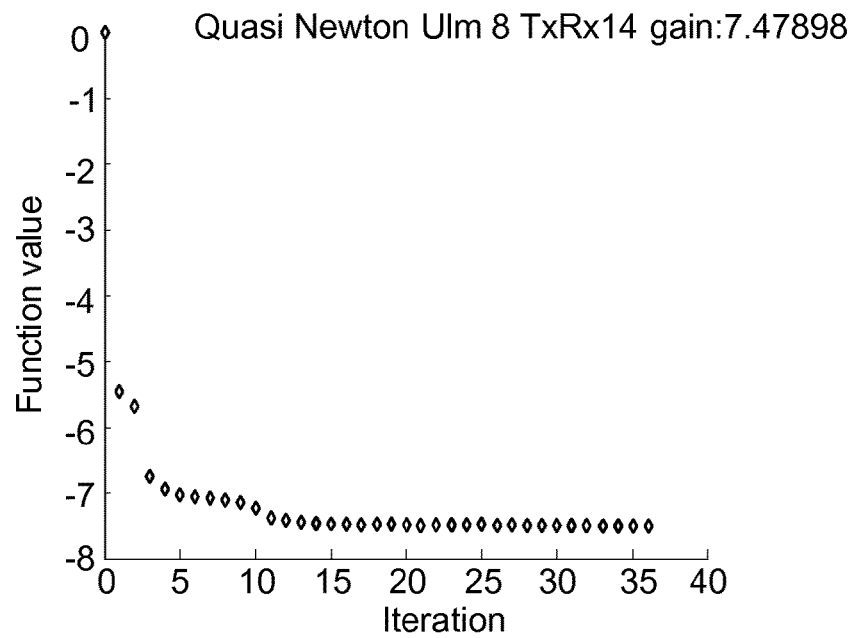
FIG. 8 shows objective function's values in different iteration steps in the learning with real data.

FIG. 8 shows the values of the objective function in different iteration steps of the learning (e.g. as described with reference to FIG. 7) with real data using the gradient-based approach in accordance with a quasi-newton algorithm.

Figure 9:
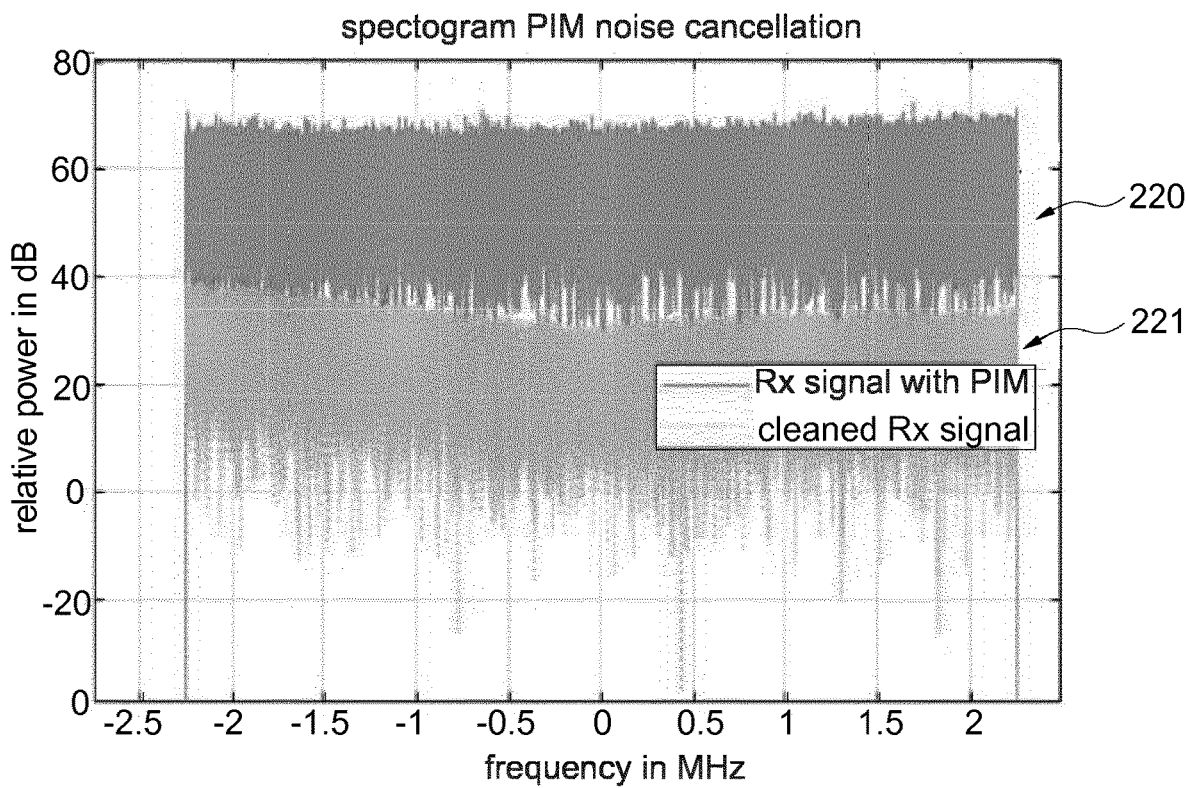
FIG. 9 is a plot showing results of a PIM cancellation in accordance with the present subject matter.

FIG. 9 shows results of a PIM cancellation in accordance with the present subject matter. FIG. 9 shows the distribution of the main receiver output signal 220 and the IM cleaned Rx main signal 221. The results of FIG. 8 are obtained using "test" data to indicate the final cancellation gain obtained.

Figure 10:
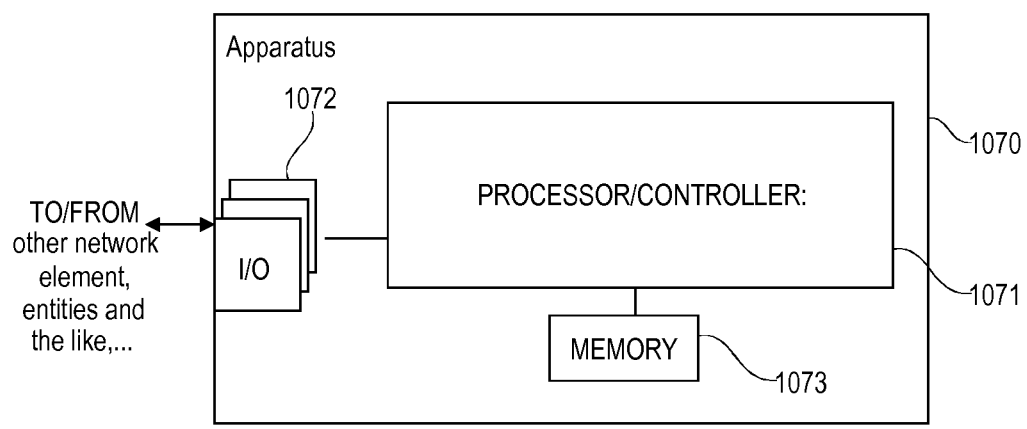
FIG. 10 is a block diagram showing an example of an apparatus according to an example of the present subject matter.

FIG. 10 is a block diagram showing an example of an apparatus according to example of the present subject matter.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus, or the like. The apparatus 1070 may comprise a processing function or processor 1071, such as a CPU or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIG. 7.

The processor 1071 is configured to optimize an objective function in a multidimensional space defined by the first and second sets of parameters 330-331 using the estimation circuitry in accordance with the present subject matter. The optimization is performed in order to obtain the values of the first and second machine learned sets of parameters that can be used in real-time to estimate PIM correction signals using the estimation circuitry.

The invention claimed is:

1. An apparatus comprising:
   circuitry configured to:
   receive a set of signals from transmitters of a communication system, the communication system having a system configuration;
   weight the received signals using a first set of machine learned parameters;
   combine the weighted signals to generate a composite signal; and
   weight the composite signal with a second set of one or more machine learned parameters, thereby estimating an interference signal that is caused with the set of signals at a receiver of the communication system.

2. The apparatus of claim 1, further comprising a subtraction circuitry configured to correct a signal being received at the receiver with using the interference signal.

3. The apparatus of claim 2, the subtraction circuitry being configured to correct the signal with a subtraction processing of the interference signal from the signal being received.

4. The apparatus of claim 1, the circuitry being further configured to align the set of signals, in accordance with delays caused with the system configuration, before the weighting.

5. The apparatus of claim 4, the circuitry being further configured to align the set of signals so that the estimated interference signal is indicative of a particular order intermodulation, IM, product.

6. The apparatus of claim 5, the circuitry being further configured to repeat the weighting, combining and weighting steps so that the estimated interference signal is indicative of another order 1M product which is different from the order IM product.

7. The apparatus of claim 1, the first set of parameters being complex parameters, wherein the circuitry is configured to perform the weighting of each of the received signals using a respective one parameter of the complex parameters.

8. The apparatus of claim 1, wherein the circuitry is configured to perform the weighting using a linear filter comprising taps of complex parameters, the complex parameters of the taps of the filters being the first set of machine learned parameters.

9. The apparatus of claim 1, the circuitry being configured to receive from an optimizer of the apparatus the set first set of machine learned parameters and the second set of machine learned parameters, the optimizer being configured to optimize an objective function in a multidimensional space defined with the first and second sets of parameters in order to obtain the set first set of machine learned parameters and the second set of machine learned parameters, the objective function relating a received training receive signal at the receiver with a corrected signal that is obtained with correcting the received training receive signal with the interference signal caused with a set of training transmit signals received at the circuitry.

10. A method comprising:
    receiving a set of signals from transmitters of a communication system, the communication system having a system configuration;
    providing a first set of machine learned parameters and a second set of one or more machine learned parameters in accordance with the system configuration;
    weighting the received signals using the first set of machine learned parameters;
    combining the weighted signals to generate a composite signal; and
    weighting the composite signal with the second set of machine learned parameters, thereby estimating an interference signal that is caused with the set of signals at a receiver of the communication system.

11. The method of claim 10, further comprising correcting a signal being received at the receiver with using the interference signal.

12. The method of claim 11, the correcting of the signal including a subtraction processing of the interference signal from the signal being received.

13. The method of claim 10, further comprising aligning the set of signals, in accordance with delays caused with the system configuration, before the weighting.

14. The method of claim 13, the aligning being performed so that the estimated interference signal is indicative of a particular order intermodulation, IM, product.

15. The method of claim 14, further comprising repeating the providing, weighting, combining and weighting steps, wherein the aligning is performed so that the estimated interference signal is indicative of another order IM product which is different from the order IM product.

16. The method of claim 10, the first set of parameters being complex parameters, wherein the weighting of each of the received signals is performed using a respective one parameter of the complex parameters; or using a linear filter comprising taps of complex parameters, the complex parameters of the taps of the filters being the first set of parameters.

17. The method of claim 10, wherein the weighting of the received signals, the combining and the weighting of the composite signal defines an estimation method that estimates the interference signal for the received set of signals, the method further comprising:
    optimizing an objective function in a multidimensional space defined with the first and second sets of parameters, the optimizing comprising:
    providing an initial set of values of the first second sets of parameters, iteratively modifying the values of the first and second sets of parameters until an optimal value of the objective function is obtained,
    wherein in each iteration the method comprises:
      receiving a set of training transmit signals,
      performing the estimation method, and evaluating the objective function, the objective function relating a received training receive signal at the receiver with a corrected signal that is obtained with correcting the received training receive signal with the interference signal caused with the set of training transmit signals;
    the optimizing resulting in the first and second sets of machine learned parameters.

18. The method of claim 17, wherein each set of signals of the sets of training transmit signals are uncorrelated signals, and each signal of the set of signals has all resource blocks being used for a maximum bandwidth usage and power.

19. The method of claim 17, the objective function being $10 \log(\mathrm{RMS}(RXb)/\mathrm{RMS}(RXa))$, wherein the optimizing comprises maximizing the objective function, wherein $RXb$ is a signal received at the receiver and $RXa$ is a corrected signal that results from the subtraction of the interference signal from RXb, and wherein RMS refers to a root mean square calculation.

20. A non-transitory computer readable medium comprising instructions stored thereon that, when executed by at least one processor, cause an apparatus to perform at least the following:

receiving a set of signals from transmitters of a communication system, the communication system having a system configuration;

providing a first set of machine learned parameters and a second set of one or more machine learned parameters in accordance with the system configuration; weighting the received signals using the first set of machine learned parameters;

combining the weighted signals to generate a composite signal; and weighting the composite signal with the second set of machine learned parameters, thereby estimating an interference signal that is caused with the set of signals at a receiver of the communication system.

\* \* \* \* \*